（12) United States Patent
Pimper et al.

(10) Patent No.: US 8,998,549 B2
(45) Date of Patent: Apr. 7, 2015

(54) WELD STUD

(71) Applicant: Newfrey LLC, Newark, DE (US)

(72) Inventors: Ralf Pimper, Homberg (DE); Joachim Schneider, Ehringshausen-katzenfurt (DE); Joachim Geist, Muecke (DE); Wolfgang Werner, Reutlingen (DE); Peter Horn, Gaertringen (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/903,560

(22) Filed: May 28, 2013

(65) Prior Publication Data

US 2013/0259597 A1 Oct. 3, 2013

Related U.S. Application Data

(62) Division of application No. 12/390,039, filed on Feb. 20, 2009.

(30) Foreign Application Priority Data

Feb. 22, 2008 (DE) .......................... 10 2008 010 595

(51) Int. Cl.
*F16B 37/06* (2006.01)
*F16B 35/04* (2006.01)
*B21H 3/02* (2006.01)

(52) U.S. Cl.
CPC ............... *F16B 35/04* (2013.01); *F16B 35/047* (2013.01); *F16B 37/061* (2013.01); *B21H 3/02* (2013.01)

(58) Field of Classification Search
CPC . B23K 35/0288; B29C 65/0672; B29C 66/47
USPC ......... 411/103, 107, 112, 113, 166, 167, 171, 411/411, 417, 418, 421, 424
See application file for complete search history.

(56) References Cited

U.S. PATENT DOCUMENTS

| RE20,580 | E | * | 12/1937 | Brown | 411/417 |
| 2,232,336 | A | * | 2/1941 | Meersteiner | 411/421 |
| 2,232,337 | A | * | 2/1941 | Meersteiner | 72/88 |
| 2,314,897 | A | * | 3/1943 | Purinton | 24/101 R |
| 2,393,990 | A | * | 2/1946 | Kamborian | 12/142 R |
| 3,218,905 | A | * | 11/1965 | Reiland | 411/417 |
| 5,513,933 | A | * | 5/1996 | Rom | 411/180 |
| 7,017,952 | B2 | * | 3/2006 | Brewer et al. | 285/391 |
| 7,056,161 | B2 | * | 6/2006 | Delcourt et al. | 439/766 |
| 7,282,662 | B2 | * | 10/2007 | Champney et al. | 219/99 |
| 7,287,944 | B2 | * | 10/2007 | Ladouceur | 411/107 |
| 2003/0059272 | A1 | * | 3/2003 | Petrok et al. | 411/107 |

* cited by examiner

Primary Examiner — Roberta Delisle
(74) Attorney, Agent, or Firm — Michael P. Leary

(57) ABSTRACT

A welding stud including a head and a shank extending from the head. The shank has an end region opposite the head and the end region includes at least two angled surfaces which incline towards an axis of the shank in a direction moving away from the head.

20 Claims, 2 Drawing Sheets

WELD STUD

CROSS-REFERENCE TO RELATED APPLICATIONS

This application is a divisional of U.S. application Ser. No. 12/390,039, filed on Feb. 20, 2009, which claims priority from German Patent Application No. 10 2008 010 595.3, filed on Feb. 22, 2008, the disclosure of which is incorporated herein by reference.

FIELD OF THE INVENTION

The invention concerns a stud. The stud may be a welding stud weldable using the drawn arc method, such as for use in automobile manufacture.

BACKGROUND ART

Welding studs of the specified type are frequently used for automated assembly processes. In these processes, the welded-on stud is populated, for example during final assembly in the automaking process, with nuts or other fasteners to which torque is applied by automated screwdriving systems, pneumatic screwdrivers or battery-operated screwdrivers. It is frequently the case that the nut is not correctly placed on the stud. Reasons for this include the short production time available and the spatial conditions in the bare chassis. These circumstances have the result that the nut or stud does not correctly engage the thread, and cross-threading occurs. This destroys the thread, and the specified ultimate strength of the threaded connection cannot be achieved. The result is a repair that entails additional costs.

Solution approaches are known from screw technology, since automated assembly processes have existed in this field for a very long time. Thus, for example, EP 0 345 373 B1, U.S. Pat. Nos. 5,073,073, 4,981,406, 5,609,455, and EP 0 840 859 B1 show options for avoiding cross-threading.

EP 0 345 373, U.S. Pat. Nos. 5,073,073, and 4,981,406 disclose screws that use the principle of an eccentric guide point. The basis of the approach here is that the screw can initially be inserted relatively far into the female thread and can immediately be brought into engagement with the correct threads. This is possible because the eccentricity or conicity of the guide points results in a smaller diameter and makes more lateral space available. After a few rotations, a secure thread engagement is achieved and the screwing process can be continued without damaging the threads.

U.S. Pat. No. 5,609,455 shows a screw with a guide point that initially has no thread at its forward-most end, and in its further progression carries a partial thread that then transitions into a full thread. Here, too, the principle in action is that the guide point can be pushed relatively far into the female thread before thread engagement takes place. One rotation of the screw permits further penetration and further alignment of the screw axis, so that the angle is significantly smaller than the pitch angle of the thread. This serves to significantly reduce the risk of cross-threading.

The screw disclosed in EP 1 008 770 A2 uses two different thread profiles that are intended to achieve better guidance during screwing-in. Moreover, the screw has a guide point that is entirely without threads. The guide point transitions to a region having a round thread that is designed such that the round thread engages the female thread even when the screw is applied to the female thread at an angle. If cross-threading takes place, the engagement of the round thread is not strong enough to destroy the female thread. Instead, the round thread snaps out of the female thread and orients itself in the correct thread. As the screw rotates further, more and more threads become engaged, until finally the fully formed thread at the back end of the screw is engaged and the ultimate strength of the threaded connection is achieved.

The aforementioned approaches are only suitable for threaded fastening processes in which the screw is arranged more or less movably in a driving tool. This is the only way it is possible for the screw to align itself after correct engagement of the threads and for the threaded fastening process to continue without damage. However, welding studs experience a rigid connection to the base material or the base sheet metal. Accordingly, they are often not movable and cannot execute this alignment motion.

SUMMARY OF THE INVENTION

According to one aspect of the invention, the welding stud is provided with at least two angled surfaces formed on the forward end of the welding stud (on the threaded point). Experiments have shown that using four angled surfaces is particularly advantageous in decreasing cross threading. Accordingly, according to one aspect of the invention, there may be four angled surfaces, however, the invention is not limited to four angled faces. The angled faces may have an angle of 3°-12° and have the result that sections at the stud point remain free of threads during subsequent thread production. According to one aspect of the invention, the angle may be about 6°.

According to another aspect of the invention, the forward region of the welding stud may be designed with at least one tapered gradation of diameter. The gradation of diameter has the result that the thread in the forward region is not fully formed, thereby assisting threading into the threads.

Experiments have shown that angled placements of the nut of up to 12° can be compensated for without difficulty with embodiments of the welding stud design, and no cross-threading takes place between the stud and female thread. This is a consequence of the fact that when the nut is placed at an angle, it experiences a tumbling motion due to the angled surfaces of the stud tip, and thereby comes into correct engagement with the screw or stud thread after a small number of rotations. Embodiments of the invention can be used for both metric and coarse-pitch studs.

Embodiments of the welding studs reduce the frequency of damage caused by threading errors. It is not necessary to place the nuts by hand first in order to ensure correct threading of the threads. This results in improved workplace ergonomics and fosters a smooth workflow. Production times are decreased, since significantly more work can be done with automatic screwdriving systems.

BRIEF DESCRIPTION OF THE DRAWINGS

The invention is explained in detail below on the basis of an example embodiment/example embodiments shown in the drawings. They show.

DETAILED DESCRIPTION OF EXEMPLARY EMBODIMENTS OF THE INVENTION

Figure 1:
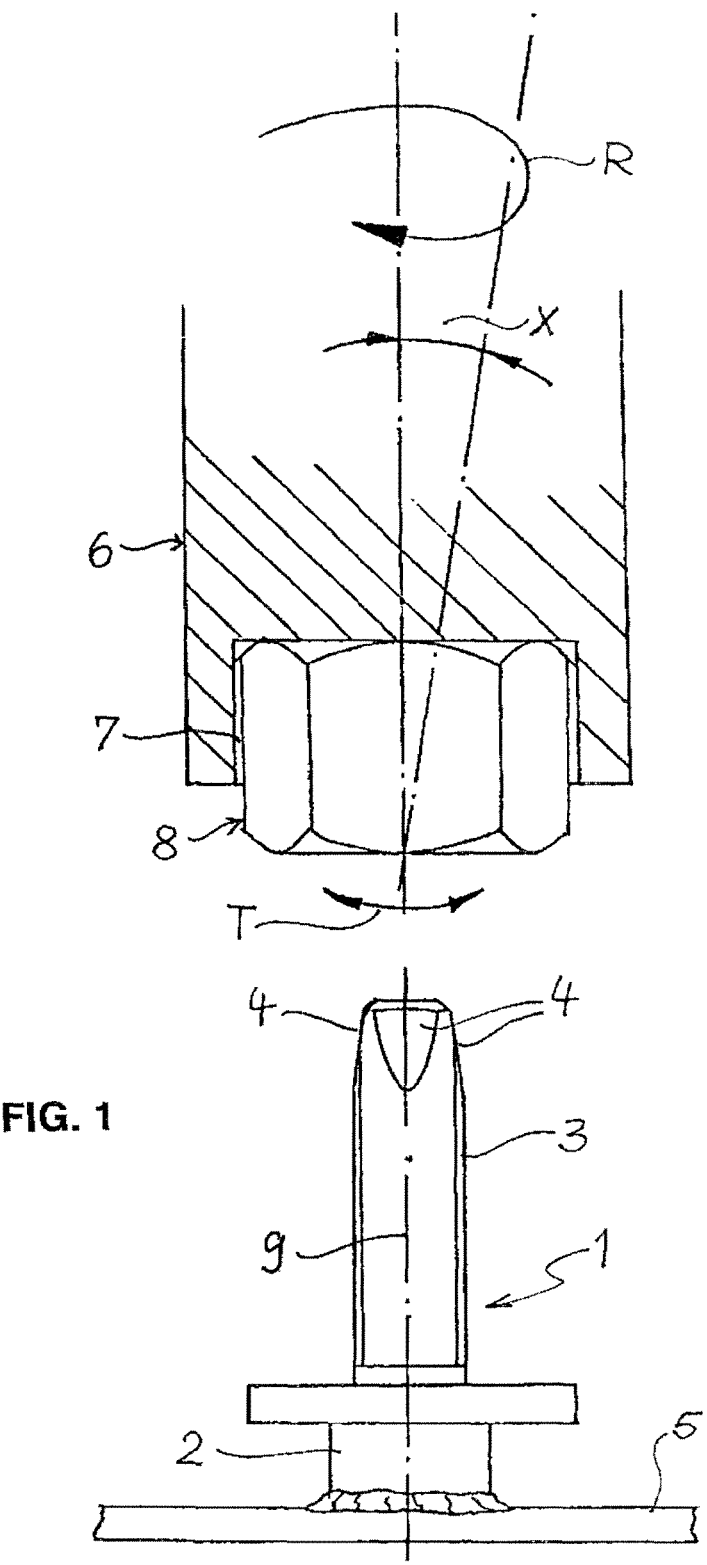
FIG. 1 a welding stud according to an exemplary embodiment of the invention welded onto a base before a nut has been screwed on, FIG. 2 a pressed blank for manufacturing a welding stud according to an exemplary embodiment of the invention, FIG. 3 a welding stud with paint scraping grooves according to an exemplary embodiment of the invention.

In many instances, welding studs are used during final assembly in order to attach functional supports, such as cable harness fasteners, pipe supports, or module carriers. In many cases, this is done semiautomatically by means of pneumatic or battery-powered screwdrivers. FIG. 1 shows such a set-up immediately prior to the screw-fastening process. The welding stud 1 includes a threaded shank 3 and is welded to a base 5 at its weldable end 2, and generally is already painted. At its forward end, exemplary embodiments of the welding stud may have at least two flat angled surfaces. In the exemplary embodiment of FIG. 1, there are four flat angled surfaces 4 which are arranged diametrically opposite one another. The angled surfaces 4 each have an inclination of 3° to 12°, relative to the stud axis 9.

In semi-automated threaded fastening processes, it is the case that a person must guide the lock nut 8 onto the stud. In general, this cannot be done exactly parallel to the stud axis 9, but instead takes place at an angle of application x between the sud axis 9 and the axis of the nut 8. As a result, when conventional welding studs are used, there is a risk of cross-threading the thread of the stud 1 and the nut. This may be even further exacerbated by, among other factors, the stud being painted.

In the case of the welding stud 1 according to an exemplary embodiment of the invention, the angled faces 4 at the stud end ensure that the nut 8 executes a slight wobbling motion T when the nut 8 is placed at an angle on the stud 1 while the screwing tool 6 undergoes rotation R simultaneously. This is helped made possible by the driving tool 6 having a certain clearance of motion 7 relative to the wrench flats of the nut 8. Proper threading of the nut 8 onto the thread 3 of the stud is ensured in this way.

Figure 2:
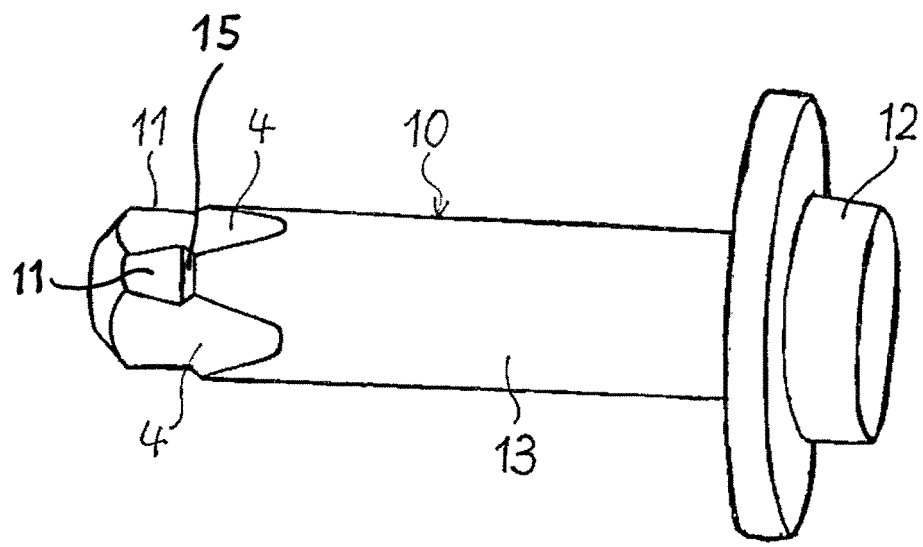

FIG. 2 shows a pressed blank 10 for producing another exemplary embodiment of a welding stud. The pressed blank 10 is formed so as to have a head 12 configured as a weldable end and a cylindrical shank 13. The end region of the shank 13 remote from the head 12 is formed so as to have at least two oblique faces which are inclined in such a way that the distance thereof from the stud axis decreases towards the end of the shank. The pressed blank 10 has a tapered diameter gradation forming at the front end of the shank 13 a first step 11, which is slightly smaller than the minor diameter of the thread. That is, steps 11 comprise portions of a cylindrical surface interrupted by the faces 4. The steps 11 are at a smaller diameter than the shank 13. In the exemplary embodiment there is an angled connecting portion 15 at which the diameter is reduced from the shank 13 to the step 11. This configuration results in an incomplete formation of the thread in the forward, stepped-down region of the stud, when threads are rolled into the circumferential surface of the shank, e.g. in one pass in a thread rolling machine by means of flat dies. Another embodiment, which is not shown, can have a first and a second step, wherein the first, forward step is significantly smaller than the nominal diameter of the thread, but only slightly smaller than the second step. The second step is slightly smaller than the nominal diameter of the thread. In both these variants, the formed-on angled faces 4 may extend past the steps.

Figure 3:
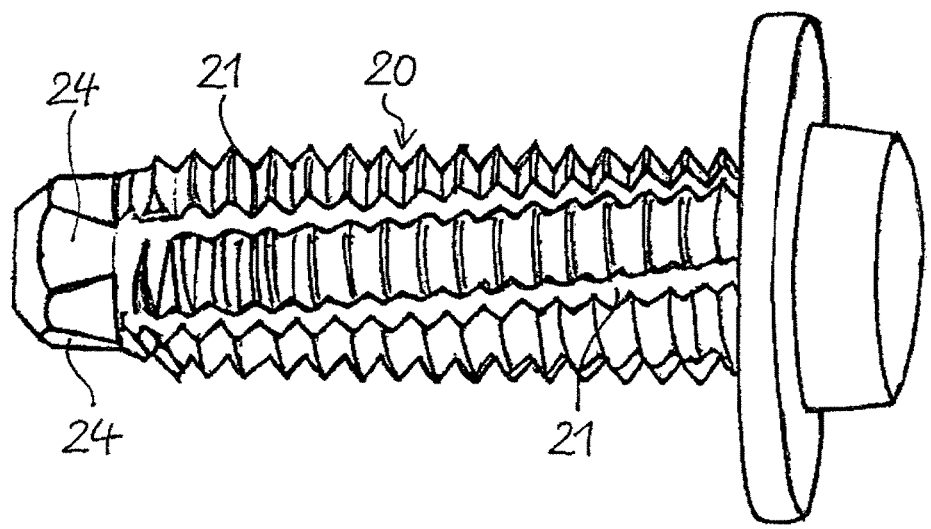

Another exemplary embodiment of a welding stud 20 is shown in FIG. 3. The welding stud 20 has paint scraping grooves 21, which end at the angled faces 24. Since the paint scraping grooves in this exemplary embodiment end at the angled faces 24, they are not effective as far as the region of the threading tip. The paint scraping grooves 21 achieve the effect that fasteners, such as threaded nuts, can be installed more easily on the prepainted welding stud.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A welding stud comprising: a weldable head and a shank extending from the head; wherein the head includes a radial flange of a first diameter and a weldable end of a second diameter less than the first diameter, and the shank includes an external thread and an end region opposite the head, wherein the end region comprises at least two flat angled surfaces which incline towards an axis of the shank in a direction moving away from the head and wherein the end region of the shank includes a first tapered gradation of diameter, and the weldable end includes a weld surface facing away from the end region.

2. The welding stud of claim 1, wherein the flat angled surfaces are inclined in the range of 2° to 20° with respect to the axis.

3. The welding stud of claim 1, wherein the flat angled surfaces are inclined in the range of 3° to 12° with respect to the axis.

4. The welding stud of claim 1, wherein the flat angled surfaces are inclined by about 6° with respect to the axis.

5. The welding stud of claim 1, wherein the end region includes at least four flat angled surfaces.

6. The welding stud of claim 1, wherein the diameter of the first tapered gradation of diameter being slightly smaller than a minor diameter of the thread.

7. The welding stud of claim 1, wherein the end region of the shank further includes a second tapered gradation of diameter, wherein the first gradation of diameter is farther away from the head of the shank and is smaller than the second gradation of diameter, and wherein the second gradation of diameter is smaller than a nominal diameter of the thread.

8. The welding stud of claim 1, wherein the shank includes at least one paint scraping groove that extends in a longitudinal direction of the shank and at which the threads are interrupted.

9. The welding stud of claim 8, wherein the paint scraping groove ends at one of the angled surfaces.

10. The welding stud of claim 9, wherein the paint scraping groove extends along a helix, wherein the pitch angle of the helix on the outer circumference of the external thread is in the range of 70° to 85°.

11. The welding stud of claim 1, wherein the end region comprises four flat angled surfaces.

12. A welding stud comprising a weldable head and a cylindrical shank, and the head includes a radial flange of a first diameter and a weldable end of a second diameter less than the first diameter, and the weldable end projects axially from the flange in a first axial direction and includes a weld surface facing in the first axial direction, and the shank extends from the head in a second axial direction opposite to the first axial direction and includes a helical external thread formed on the shank and an end region opposite the head, and the end region comprises a first flat inclined surface and a second flat inclined surface which are inclined so that the radial distance thereof from the stud axis decreases towards the end of the shank remote from the head, and wherein the end region of the shank further includes a first tapered gradation of diameter.

13. A welding stud according to claim 12, wherein the end region of the shank opposite the head includes a third flat inclined surface and a fourth flat inclined surface.

14. A welding stud according to claim 12, wherein the first inclined surface and second inclined surface have an inclination of 2° to 20° relative to the stud axis.

15. A welding stud according to claim 12, wherein the first inclined surface and second inclined surface have an inclination of 3° to 12° relative to the stud axis.

16. A welding stud according to claim 12, wherein a diameter of the first gradation of diameter is smaller than a root diameter of the thread.

17. A welding stud according to claim 12, wherein the end of the shank opposite the head includes a second gradation of diameter forward of the first gradation of diameter, and wherein the first gradation of diameter is smaller than the second gradation of diameter, and wherein the second gradation of diameter is slightly smaller than the a diameter of the thread.

18. A welding stud according to claim 12, wherein the shank includes a paint scraping groove that extends in the longitudinal direction of the shank and at which the threads are interrupted.

19. A welding stud according to claim 18, wherein the paint scraping groove ends at an angled surface.

20. A welding stud according to claim 18, wherein the paint scraping groove extends along a helix, and the pitch angle of the helix on the outer circumference of the external thread is in the range of 70° to 85°.

* * * * *